March 5, 1957  B. ROBERTS  2,784,011
HOSE COUPLING WITH SPRING DETENT ON ROTATABLE COLLAR
Filed Feb. 2, 1953
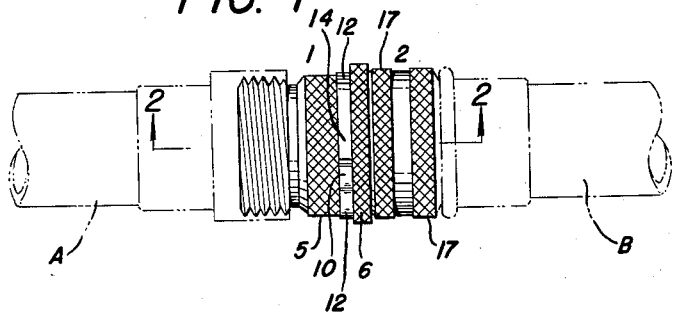
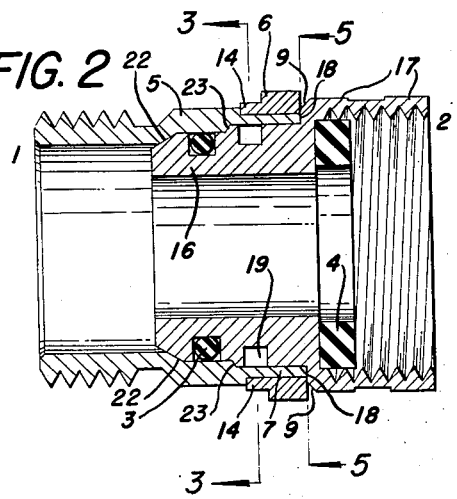
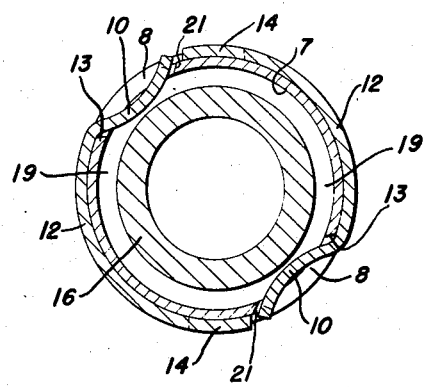
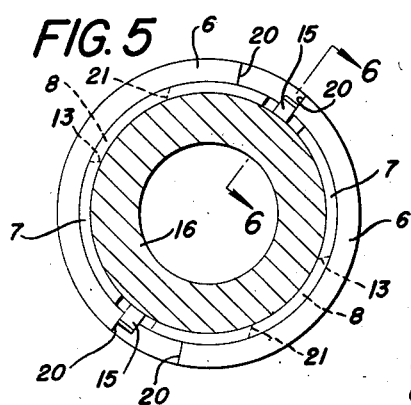
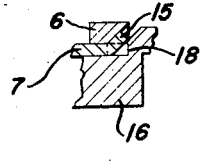
INVENTOR.
BRUCE ROBERTS
BY
George W. Saywell
ATTORNEY

United States Patent Office 2,784,011
Patented Mar. 5, 1957

2,784,011

HOSE COUPLING WITH SPRING DETENT ON ROTATABLE COLLAR

Bruce Roberts, Oberlin, Ohio, assignor to The American Specialty Company, Amherst, Ohio, a corporation of Ohio Application February 2, 1953, Serial No. 334,510

8 Claims. (Cl. 285—308)

The invention relates to hose couplings.

The objects of the invention are to provide a hose coupling in which two sections of hose can be readily and conveniently fastened together or separated by a locking member which is a permanently-secured element of the coupling; in which the unfastening of socket and nipple parts of the coupling is effected by a manual relative movement of a locking member on these two coupling parts; in which the fastening of the socket and nipple parts of the coupling is effected automatically by the mere telescopic passing of the coupling nipple into the socket; and in which the coupling members are easily and economically manufactured and involve no complicated parts.

The annexed drawing and the following description set forth in detail certain means illustrating the invention in hose couplings, such drawing and description showing, however, only one of the various forms in which the principle of the invention may be embodied.

In said annexed drawing:

Figure 1 is a side elevation of the hose coupling comprising telescoped nipple and socket parts in locked condition, these nipple and socket parts being respectively formed for connection to two hose sections which are suggested in the figure;

Figure 2 is an axial longitudinal section, on an enlarged scale, taken in the plane indicated by the line 2—2, Figure 1;

Figure 3 is a transverse section, taken in the plane indicated by the line 3—3, Figure 2, the section particularly showing the position of the locking member when the coupling nipple and socket parts are secured together;

Figure 4 is a section, similar to Figure 3, except that the locking member for the two coupling parts is shown in the position which it occupies when the coupling parts are free to be pulled apart;

Figure 5 is a transverse section, taken in the plane indicated by the line 5—5, Figure 2; and Figure 6 is a fragmentary longitudinal section, taken in the plane indicated by the line 6—6, Figure 5.

Referring to the annexed drawing, in which the same elements are indicated by the same respective numbers in the several views, a coupling socket part 1, Figures 1 and 2, is adapted to accommodate in telescoping relation a coupling nipple part 2, these parts 1 and 2 being tubular cylindrical members respectively formed at one end for attachment to hose sections suggested by "A" and "B." Gaskets 3 and 4 are mounted in coupling part 2 to insure a leakproof condition between abutting surfaces of the coupling parts 1 and 2, and the coupling part 2 and hose section B, respectively.

Coupling part 1 is provided with an intermediate enlarged knurled portion 5, and an inner and a still larger knurled collar 6 forming a locking element and mounted at a spaced distance from the portion 5 and rotatable upon the inner end 7 of the coupling part 1. The section 7 is a reduced inner end part of the coupling portion 5. Actually, the collar 6 at its inner end slightly overlaps the section 7.

The section 7 is formed with diametrically opposed slots or through holes 8 between the enlarged portion 5 of the coupling part 1 and the transverse plane defining the outer face of the enlarged portion of the collar 6. The collar 6 which has limited circumferential movement upon the periphery of the end 7 is provided with two longitudinally-extended lugs 14, in the plane of the slots 8, which are parts of spring members having also resilient intermediate parts 12, Figures 3 and 4, with inwardly bent end parts 10 adapted to pass through the slots 8. In the form of the invention shown and described all of the spring parts 10, 12 and 14 are formed integrally with the collar 6 and engage the periphery of the socket end 7 between the outer end of the collar 6 and the enlarged portion 5 of the socket 1, as hereinafter fully described. The parts of the section 7 of the coupling part 1 which define the ends of the holes 8 form opposed inwardly-tapering walls 13 and 21 for said holes whose function will be hereinafter fully described.

The coupling part or nipple 2 is formed with an outer knurled end portion 17 adapted to be secured to the hose section B and with an inner end reduced portion 16 adapted to telescope within the socket coupling part 1. The coupling part or socket 1 is formed with shoulders 22 and 23 for proper telescoping engagement of the coupling parts 1 and 2 in the positions shown in Figure 2. The inner edge of the knurled portion 17 of the coupling part 2 is outwardly beveled, as indicated by 9, Figure 2, from about the line 18, and lies closely adjacent the inner edge of the inner face of the collar 6 when the coupling parts 1 and 2 are in proper telescoped engagement. The inner edge of the reduced section 7 of the coupling part 1 abuts the inner edge of the inner face of the section 17 of the coupling part 2 interiorly of the bevel 9.

The reduced portion 16 of the coupling nipple 2 is formed with a peripheral groove 19 transversely aligned, in the locked condition of the coupling, with the slots 8 formed in the reduced portion 7 of the coupling socket 1.

The inner face of the reduced portion 7 of the coupling socket 1 is notched to form outwardly-directed diametrically opposed stop lugs 15, Figures 5 and 6, by and over which arcuate slots 20 formed in the inner face of the collar 6 play, so that the amount of movement of the collar 6 upon the outer surface of the socket portion 7 is determined by engagement of the end walls of the slots 20 with the stop lugs 15.

The outer ends of the stop lugs 15 also act as retaining members for the collar 6 preventing the latter from slipping off the end 7 of the socket part 1, as shown in Figures 5 and 6.

Referring particularly to the structure of the unitary assembly of the collar 6, and spring parts 10, 12, and 14, the same is formed from a tubular cylindrical blank, preferably of brass, which is cut down on one side from its normal diametrical dimension to an extent so that it is equal to the desired diameter of the spring parts 10, 12, and 14, in locking condition. In fact, this reduced part of the blank is formed into the spring parts 10, 12, and 14. This reduced part of the blank is thin enough, together with the character of the blank material, to have spring characteristics. The reduced blank part is cut longitudinally in a diametric plane to form two separate spring sections. A major portion of each of these spring sections is separated from the large portion of the blank by cutting transversely through them adjacent the face of the large blank portion. The uncut parts of the spring sections, viz., the portions 14 of the spring are still a part of the original blank and the portions 12 thus cut away are connected only by their respective inner ends, and connected only to the portions 14. These portions 12 are free to act resiliently, and their free outer ends are bent radially inwardly to form the concave spring portions 10 which tend to pass through the slots 8. The bent spring portions 10 have a circumferential dimension somewhat greater than the length of the slots 8 and a depth sufficient to engage the groove 19.

When the collar 6 is moved clockwise manually toward unlocking position, Figure 4, the bent spring portions 10 strike the far walls 21 of the slots 8 and are moved under tension outwardly of the slots 8 and of the groove 19. The intermediate spring parts 12 also are moved outwardly and away from the socket portion 7. When an end wall of the slots 20 strike the lugs 15 the spring sections have been moved outwardly enough to permit pulling the coupling members apart. The collar 6 is held in unlocking position until the coupling members 1 and 2 are pulled apart.

As soon as the coupling socket 1 and nipple 2 have been pulled apart and the collar 6 released, the spring parts 10 and 12 snap back into the positions shown in Figure 3.

When it is desired again to connect the coupling socket 1 and nipple 2, the latter is passed into the socket and the nipple counterpart outer shoulder of the shoulder 22 of the socket and then, the nipple counterpart outer shoulder of the shoulder 23 gradually expand the spring parts 10 and 12 so that the proper telescoped relation of the socket and nipple can be obtained, the spring parts 10 and 12 snapping into locking position when the groove 19 radially registers with the slots 8.

During the unfastening movements of the collar 6, the near portions, considered clockwise, of the bent spring parts 10, Figure 4, move away from the near walls 13 of the slots 8, the far portions of said bent spring parts 10 pushing by and outwardly of the far walls 21 of the slots 8, and the spring parts 12 are forced outwardly of the socket portion 7. During the fastening movements of the collar 6, when the latter is manually released, or when the socket 1 and nipple 2 have been completely telescoped, the several spring parts 10 and 12 act automatically to cause an engagement of the bent spring portions 10 with the groove 19, Figure 3.

The gasket 3 is of a proper cross-section and so positioned in the nipple portion 16 as not to be sheared or worn down by the spring portions 10 and 12 as the coupling parts are being telescoped into locked position.

What I claim is:

1. A locking element for use with telescoping tubular hose nipples and hose sockets and like telescoping members have respectively peripheral grooves and through holes aligned with the grooves, the sockets having walls defining the holes therethrough, comprising a collar mounted for rotatable movement upon the socket, and a spring section secured to the collar and having a portion thereof normally bent to intersect a socket hole and engage a nipple groove to secure the nipple and socket together, the rotatable movement of the collar, when the nipple and socket are secured together, effecting the engagement of a wall of the socket hole by the bent spring portion to flex said spring portion out of the nipple groove to free the nipple and socket one from the other.

2. A locking element, characterized as in claim 1, for use with telescoping members of the character described, in which the spring section has spaced multiple portions thereof bent normally respectively to intersect said multiple of spaced through holes.

3. A locking element, characterized as in claim 2, in which there are two independent and separate spring sections forming a substantially continuous complete circular spring member for intersection by the bent portions of the spring sections of two spaced holes of the socket and engagement with a continuous groove of the nipple.

4. A locking element, characterized as in claim 1, in which the socket is formed with an extended portion thereof forming a stop, and in which the rotatable collar is formed with a socketed part for cooperation with the stop to limit the rotatable movement of the collar.

5. A locking element, characterized as in claim 1, in which the spring section is a flange portion of the collar and is severed from the collar body over a substantial part of the spring section length but not over its entire length, the severed flange part of the collar having the bent portion of the spring section, whereby such severed spring part can flex to cause the bent portion thereof to intersect a through hole of the socket and be engaged with or disengaged from the nipple groove.

6. A hose coupling comprising a tubular hose socket having a body through hole, a tubular hose nipple having a peripheral groove aligned with the socket hole, and a collar rotatably mounted on the socket, said collar having a spring flange section severed from the collar body over a part of but not the entire flange length, the severed spring section having a portion thereof bent normally to intersect the socket hole and engage the nipple groove for coupling together of the socket and nipple.

7. A hose coupling, characterized as in claim 6, in which opposed inwardly-tapering walls are provided in the socket and define the through holes thereof, one of said walls engaging the bent portion of the severed spring flange section, upon a manual unlocking movement of the collar, and tensioning the spring flange section outwardly of the socket to disengage the bent spring portion from the nipple groove, and in which, upon release of the collar, the spring flange will spring back into position on the socket and the bent portion of the spring flange will engage another socket wall and be caused to assume coupling position with the nipple groove.

8. A hose coupling, characterized as in claim 6, in which the hose socket has an inner shoulder, in which the hose nipple has an outer projecting portion complementary to the socket shoulder, and in which said complementary nipple portion moves the bent portion of the spring flange section into non-groove-engaging position during the telescoping of the socket and nipple for coupling thereof, the bent portion of the spring section moving under spring tension back into groove-engaging position when the nipple groove is aligned with the socket through hole.

References Cited in the file of this patent

UNITED STATES PATENTS

| 794,110 | McDowell | July 4, 1905 |
| 933,361 | Hebert | Sept. 7, 1909 |
| 1,882,625 | Jacobi | Oct. 11, 1932 |
| 1,903,353 | Wingard | Apr. 4, 1933 |
| 2,531,401 | Clerke | Nov. 28, 1950 |

FOREIGN PATENTS

| 504,103 | Belgium | July 14, 1951 |